US012551406B2

(12) United States Patent
Park et al.

(10) Patent No.: US 12,551,406 B2
(45) Date of Patent: Feb. 17, 2026

(54) DRUG MIXING UNIT FOR SYRINGE

(71) Applicant: HYSENSBIO, Gwacheon-si (KR)

(72) Inventors: Joo Hwang Park, Incheon (KR); Dong Seol Lee, Seoul (KR)

(73) Assignee: HYSENSBIO, Gwacheon-si (KR)

( * ) Notice: Subject to any disclaimer, the term of this patent is extended or adjusted under 35 U.S.C. 154(b) by 543 days.

(21) Appl. No.: 18/023,497

(22) PCT Filed: Sep. 3, 2021

(86) PCT No.: PCT/KR2021/011915
§ 371 (c)(1),
(2) Date: Feb. 27, 2023

(87) PCT Pub. No.: WO2022/050751
PCT Pub. Date: Mar. 10, 2022

(65) Prior Publication Data
US 2023/0310278 A1 Oct. 5, 2023

(30) Foreign Application Priority Data
Sep. 7, 2020 (KR) ........................ 10-2020-0113856

(51) Int. Cl.
*A61J 1/20* (2006.01)
*A61J 1/06* (2006.01)
*A61J 1/14* (2023.01)

(52) U.S. Cl.
CPC ............... *A61J 1/2096* (2013.01); *A61J 1/06* (2013.01); *A61J 1/1412* (2013.01); *A61J 1/2003* (2015.05);
(Continued)

(58) Field of Classification Search
CPC .......... A61J 1/2096; A61J 1/06; A61J 1/1412; A61J 1/2003; A61J 1/201; A61J 1/2041;
(Continued)

(56) References Cited

U.S. PATENT DOCUMENTS

2012/0104045 A1* 5/2012 Chang ............... A61M 5/31596
222/145.5
2016/0128905 A1* 5/2016 Ishihara .................... A61J 1/22
604/407

FOREIGN PATENT DOCUMENTS

JP 53-74996 U 6/1978
JP 6-42675 Y2 11/1994
(Continued)

OTHER PUBLICATIONS

Office Action issued May 14, 2024 in Japanese Application No. 2023-514427.
(Continued)

*Primary Examiner* — Tasnim Mehjabin Ahmed
(74) *Attorney, Agent, or Firm* — Sughrue Mion, PLLC

(57) ABSTRACT

A drug mixing unit for a syringe is disclosed. The drug mixing unit contains a barrel member having a first flow path through which a liquid drug is to be pushed in; and a plug member having an insertion part inserted into the barrel member, the insertion part having a second flow path, for drawing out a drug mixture, formed on inner side thereof and a through hole, connected to the second flow path, formed on one surface thereof, wherein the plug member is connected to the barrel member to form a predetermined drug mixing space, the drug mixing space has a drug to be mixed with the liquid drug that has been pushed in through the first flow path. The unit also contain a third flow path, through which the drug mixture flows from the drug mixing space to the through hole.

11 Claims, 12 Drawing Sheets

(52) U.S. Cl.
CPC ............. *A61J 1/201* (2015.05); *A61J 1/2041* (2015.05); *A61J 1/2048* (2015.05); *A61J 1/2051* (2015.05); *A61J 1/2055* (2015.05); *A61J 1/2068* (2015.05); *A61J 1/2089* (2013.01)

(58) Field of Classification Search
CPC ...... A61J 1/2048; A61J 1/2051; A61J 1/2055; A61J 1/2068; A61J 1/2089
See application file for complete search history.

(56) References Cited

FOREIGN PATENT DOCUMENTS

| | | | |
|---|---|---|---|
| JP | 2014-505546 | A | 3/2014 |
| JP | 2017-527427 | A | 9/2017 |
| KR | 10-1222888 | B1 | 1/2013 |
| KR | 10-1524221 | B1 | 5/2015 |
| KR | 10-2017-0056605 | A | 5/2017 |
| KR | 10-1881095 | B1 | 7/2018 |
| KR | 10-2020-0049360 | A | 5/2020 |
| KR | 10-2258450 | B1 | 5/2021 |

OTHER PUBLICATIONS

International Search Report for PCT/KR2021/011915, dated Dec. 27, 2021.

* cited by examiner

【Fig. 1】
1000
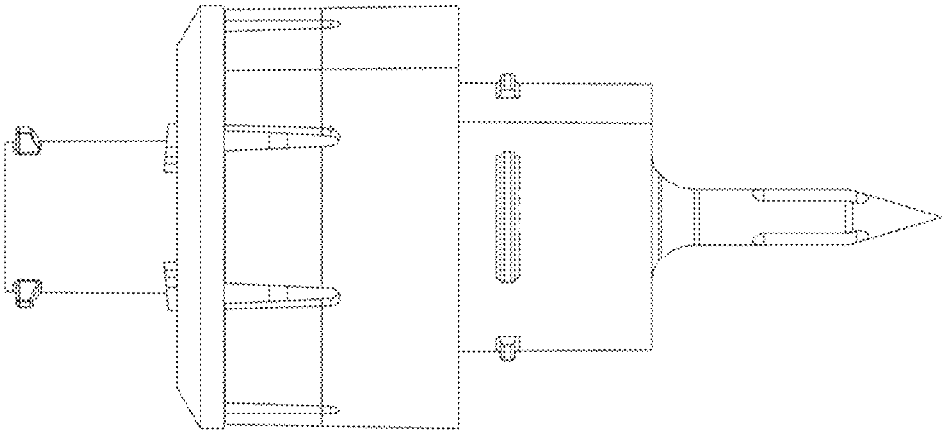

【Fig. 2】
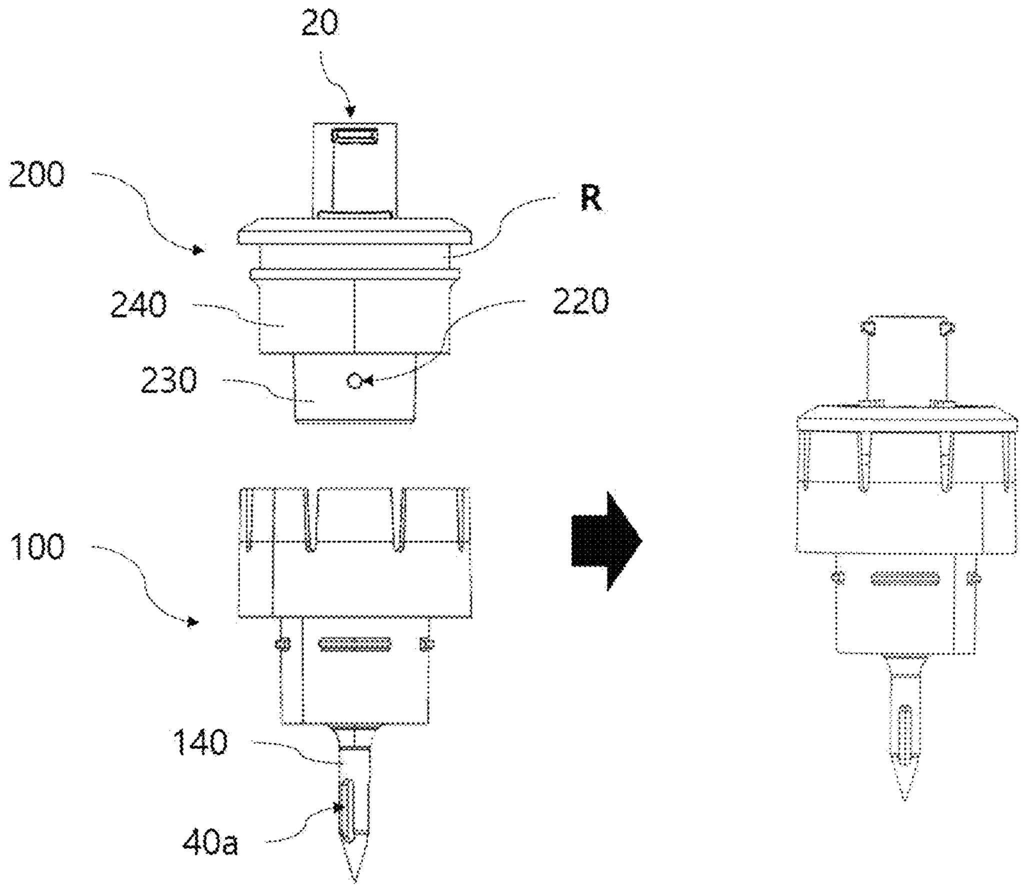

【Fig. 3】
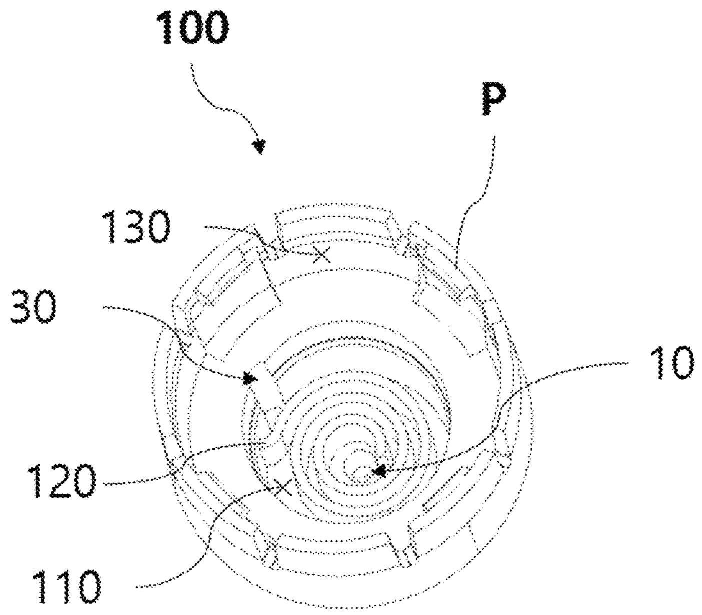
【Fig. 4】
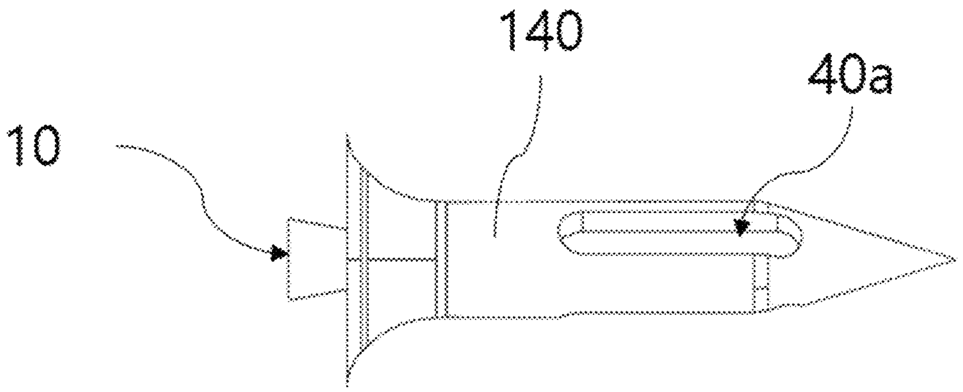

【Fig. 5】
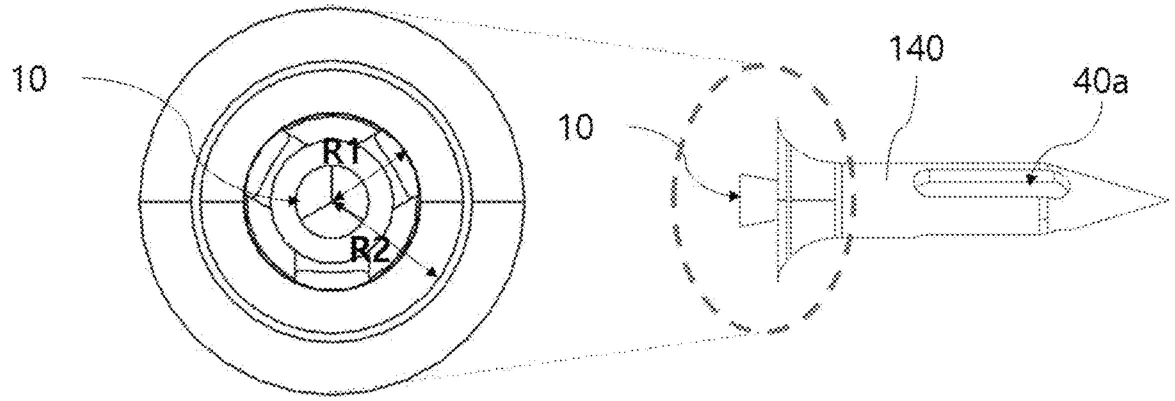

【Fig. 6(a)】
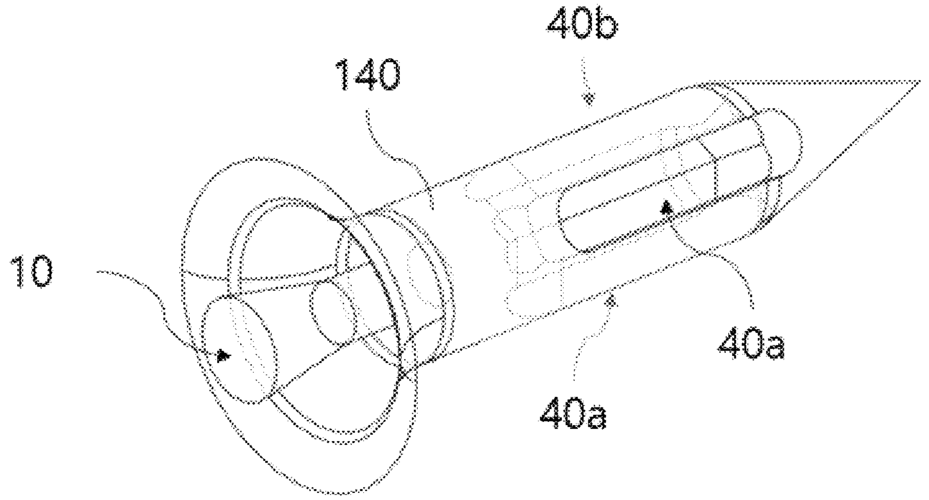
【Fig. 6(b)】
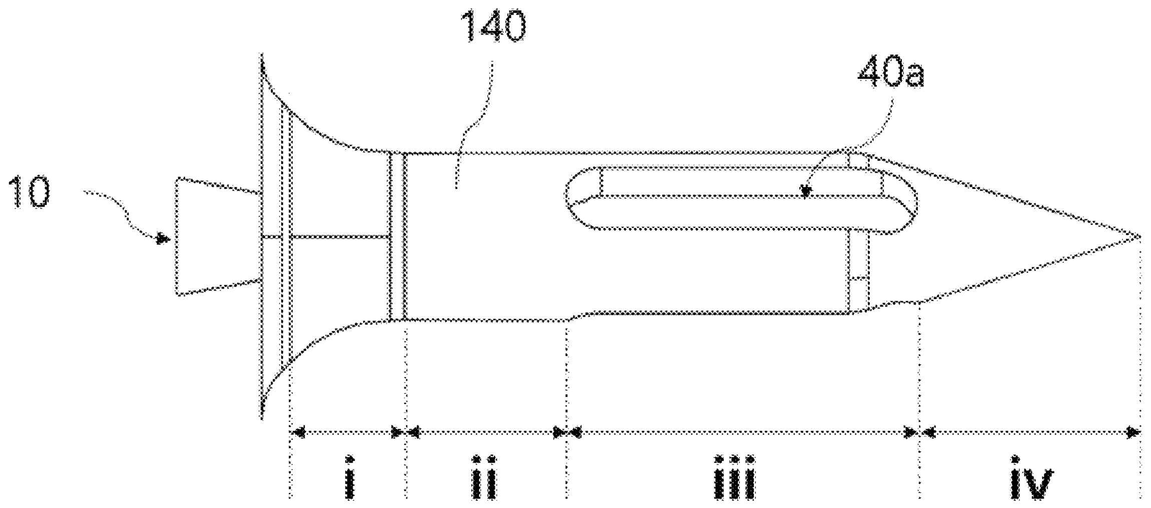

【Fig. 9(a)】
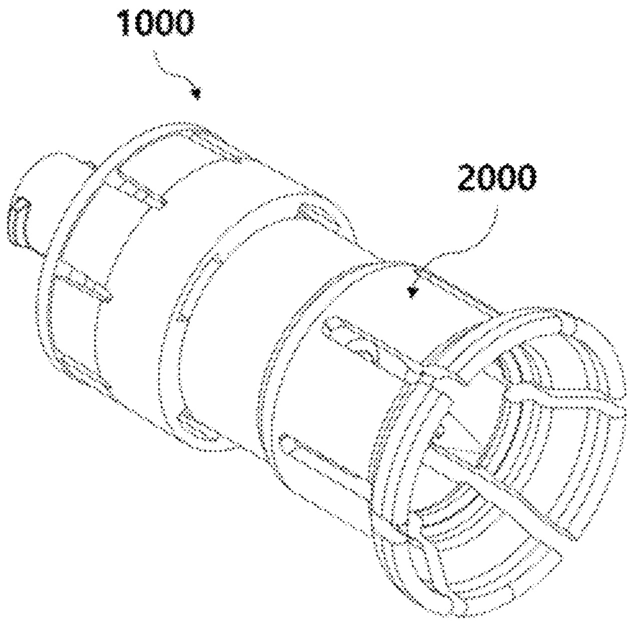
【Fig. 9(b)】
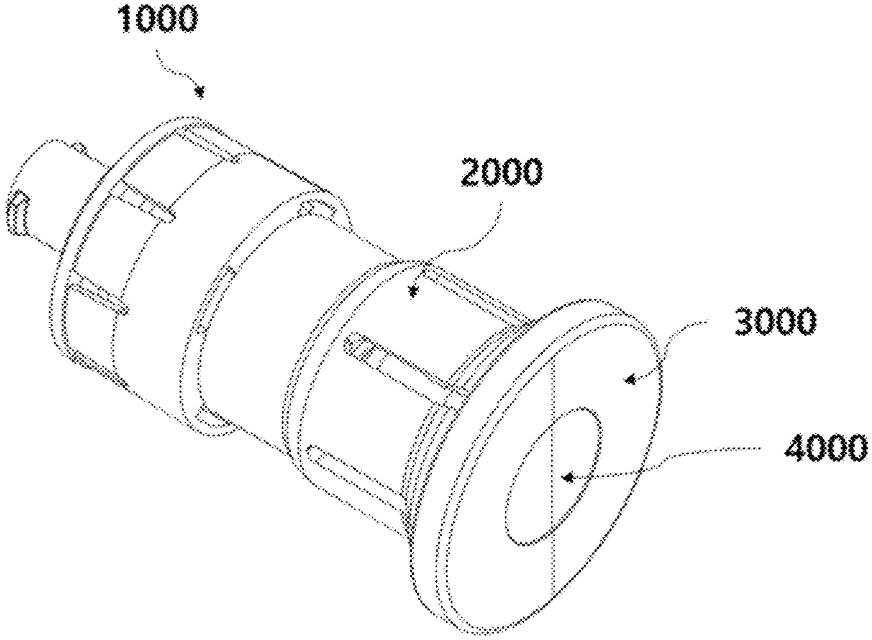

【Fig. 10】
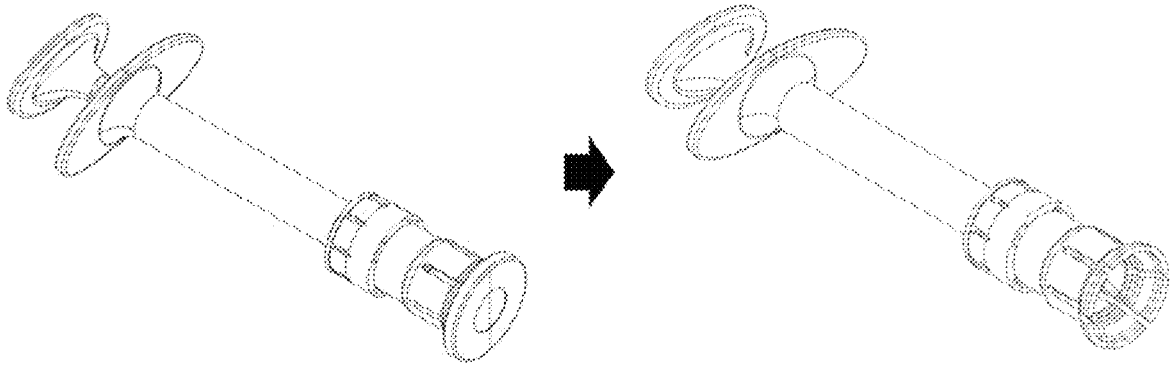
(a) (b)

(a) (b) (c) (d) (e) (f)

DRUG MIXING UNIT FOR SYRINGE

CROSS REFERENCE TO RELATED APPLICATIONS

This application is a National stage of International Application No. PCT/KR2021/011915 filed Sep. 3, 2021, claiming priority based on Patent Application No. 10-2020-0113856 filed Sep. 7, 2020.

TECHNICAL FIELD

The present invention relates to a drug mixing unit, and more particularly, to a drug mixing unit for mixing a heterogeneous drug to be used in combination with a syringe.

BACKGROUND ART

A syringe or an injector is a tool used to inject or pull out a liquid material. Although it is a general use that the liquid material for an injection is prepared and filled in a syringe before the injection, some drugs may be quickly decomposed in the state of the solution and lose efficacy, and in the case that it is hard to prepare as the liquid material in advance, it may be prepared in the form of a liquid material immediately before the injection. In addition, in the case that refrigeration and special packaging are needed for the stability of the drug storage, the drug needs to be mixed and used before an injection.

In the case of the drug for being injected through a syringe, the drug is mixed in the state of being blocked from external air to prevent contamination and oxidation, and the mixed liquid needs to be filled into the syringe in the state of being separated from the outside. Particularly, in order to ensure the safety of storage, most drugs are manufactured in a solid form of powder or tablet form, but a complex process needs to be preceded to reconfigure the solid drug into a liquid formulation before administering the solid drug, and there is a risk such as contamination of the drug, air bubbles occurring during the process.

The prior art documents for a syringe capable of injecting two or more types of drugs at the same time are Korea Patent Publication Nos. 10-2014-0017947, 10-2011-0041826, and the like, these techniques have the feature that a second syringe of a small diameter is inserted into a first syringe of a greater diameter, and a piston in the first syringe of a greater diameter is connected to an outlet of the second syringe of a small diameter, and accordingly, a drug in a liquid state filled in the second syringe of a small diameter is supplied and mixed with the internal powder in the first syringe of a greater diameter.

However, according to the prior art documents, a sufficiently sealed individual space is not secured for each drug in the scheme in which the second syringe is inserted in a single large syringe, but the drug mixing space is secured by coupling the syringe, and accordingly, the storage stability of the drug is low, and since the operation of the second syringe may affect the operation of the first syringe, there is a high possibility of malfunction.

In addition, in the case that the heterogeneous drug for injection is in a liquid state, the mixing may be made at a rapid rate, but in the case that a solid state drug such as a powder or a tablet is mixed with a dilution, a process of shaking the mixture sufficiently is required, and there is a possibility that air bubbles are formed in the process.

A method for combining a syringe filled with dilution in a separate container where a powder or a tablet is stored to inject directly into a body is proposed, but as described above, it is difficult for the powder or a tablet to be sufficiently dissolved and a case may occur that a needle is blocked.

In the case that dilution is injected through a syringe, a drug in the state of a powder or tablet that is not sufficiently dissolved may block the needle of the syringe and disrupt the flow of the drug. In order to sufficiently dissolve the powdered drug immediately before injection, a method may be considered to increase the contact path and time of the dilution and the powdered drug to ensure the sufficient dissolution time. However, even in this case, it is difficult to conclude that the powdered drug will be sufficiently dissolved. Particularly, in the case that the powder or granular material that was blocking the needle is dissolved by the dilution and the drug moving path is opened at a time, and in this case, when a plunger is manipulated with an excessive pressure, the needle may be separated from the syringe owing to the pressure. Furthermore, in the case that the injection needs to be made in a state where a separate container is combined with the syringe, the use convenience may be significantly reduced if there is not enough space for the syringe to access.

(Patent document 0001) Korea Patent Publication 10-2014-0017947 (published on Feb. 12, 2014)

(Patent document 0002) Korea Patent Publication 10-2011-0041826 (published on Apr. 22, 2011)

DISCLOSURE

Technical Problem

The present invention is directed to providing a drug mixing unit for a syringe which makes a heterogeneous drug mixed in a sealed state having no contact with external air, and the contamination possibility is significant reduced.

The present invention is also directed to providing a drug mixing unit for a syringe in which dilution moved by a negative pressure generated by manipulating a plunger of the syringe is mixed with the drug prepared in the drug mixing unit, moved to a cylinder of the syringe, and filled in the syringe, and accordingly, the convenience of mixing a drug is increased.

The present invention is also directed to providing a drug mixing unit for a syringe which provides an extended moving path to secure a sufficient time for mixing a powdered drug prepared therein with dilution moved by a negative pressure generated by manipulating a plunger of the syringe.

The present invention is also directed to providing a drug mixing unit for a syringe in which enough dilution is mixed with a powdered drug and moved to a cylinder of the syringe even by a small negative pressure generated by manipulating a plunger of the syringe.

The objects to be achieved by the present disclosure are not limited to the above-mentioned objects, and other objects not mentioned herein may be clearly understood by those skilled in the art from the following description.

Technical Solution

One aspect of the present invention provides a drug mixing unit including: a barrel member formed with a first channel through which a drug liquid is introduced; and a plug member provided with an insertion portion inserted into the barrel member, and formed with a second channel through which a mixed drug is extracted and a through hole connected to the second channel on a surface of the insertion portion, and the plug member is coupled with the barrel member to form a predetermined drug mixing space, wherein a drug is provided to form the mixed drug with being mixed with the drug liquid introduced through the first channel, and wherein a third channel is formed in an inner surface of the barrel member, through which the mixed drug moves from the drug mixing space to the through hole.

Here, the barrel member may be provided with a protruding type of a spike needle that forms the first channel on an outer surface thereof, and the spike needle may for at least one or more openings connected to the first channel on the outer surface thereof.

Here, the plug member may include a protrusion coupling portion that forms the second channel.

Here, the drug mixing space may form a spiral path from a predetermined position spaced apart from the first channel to the third channel, and the spiral path may be formed by a partition wall portion continuously provided to contact an outer bottom surface of the insertion portion of the plug member from the inner bottom surface.

Here, the third channel may be disposed with being spaced apart by a predetermined distance.

Here, the drug mixing unit may further include a protecting portion for which the barrel member provided to block the first channel from external air is inserted and supported and an under cap in which a grip portion for fixedly supporting an upper cap of a vial in which the drug liquid is stored is integrally formed.

Here, the drug mixing unit may further include an upper cap to block the second channel from external air.

Here, the second channel may be provided to be connected to a syringe that provides a negative pressure to introduce the drug liquid.

Here, the drug mixing unit may further include rubber stopper in which the spike needle is inserted and supported to block the first channel from external air.

Here, the first channel, the second channel, and the third channel may be provided not to be directly connected with each other.

Here, the first channel may be protruded and formed with a predetermined height from the inner bottom surface of the barrier member, but formed with a height lower than the bottom surface of the insertion portion of the plug member.

Here, the drug may be a liquid phase drug, a powdered drug, or a tablet drug.

Here, the barrel member and the plug member may be fixedly supporting with each other through an uneven portion or coupled by a rotational coupling through a thread.

Here, the plug member may further include a supporting portion provided to have an outer diameter than that of the insertion portion, and further includes a silicone ring member for blocking external air when coupling with the barrel member between the insertion portion and the supporting portion of the plug member.

Here, an inner diameter of the through hole may be greater than an inner diameter of the first channel and smaller than an inner diameter of the second channel.

Advantageous Effects

According to a drug mixing unit for a syringe according to an embodiment of the present invention, a heterogeneous drug coupled with a vial in an air tightness manner provided with dilution is mixed in a sealed state without contacting external air, and the contamination possibility may be significant reduced.

According to a drug mixing unit for a syringe according to an embodiment of the present invention, dilution moved by a negative pressure generated by manipulating a plunger of the syringe is mixed with the drug prepared in the drug mixing unit, moved to a cylinder of the syringe, and filled in the syringe, and accordingly, the convenience of mixing a drug is increased.

According to a drug mixing unit for a syringe according to an embodiment of the present invention, an extended moving path may be provided to secure a sufficient time for mixing a powdered or liquid drug prepared in the drug mixing unit with dilution or other drug moved by a negative pressure generated by manipulating a plunger of the syringe with homogeneous concentration.

According to a drug mixing unit for a syringe according to an embodiment of the present invention, enough dilution is supplied through a needle even by a small negative pressure generated by manipulating a plunger of the syringe.

The effects to be achieved by the present disclosure are not limited to the above-mentioned effects, and other effects not mentioned herein may be clearly understood by those skilled in the art from the following description.

DESCRIPTION OF DRAWINGS

FIG. 1 is a diagram illustrating a drug mixing unit according to an embodiment of the present invention.

FIG. 2 is diagram illustrating the feature that a barrel member and a plug member included in the drug mixing unit according to an embodiment of the present invention are separated and coupled.

FIG. 3 is a perspective diagram illustrating an inside of the barrel member.

FIG. 4 is a diagram illustrating a side surface of the protruding type spike needle formed on the barrel member.

FIG. 5 is a diagram illustrating a rear end surface and a side surface of the spike needle.

FIGS. 6(*a*) and 6(*b*) are diagrams exploded perspective diagram and a lateral diagram showing the spike needle from a rear side.

FIGS. 9(*a*) and 9(*b*) are diagrams illustrating the feature that the barrel member is coupled with the grip portion for fixedly supporting the upper cap of the vial and the feature that a rubber stopper to which the barrel member and the spike needle are inserted and supported is coupled with the protecting portion to which the barrel member is inserted and supported.

FIG. 10 illustrates the feature that the drug mixing unit according to an embodiment of the present invention is coupled with the syringe and the rubber stopper and the protecting portion are removed before being coupled with the vial.

BEST MODE OF THE INVENTION

Figure 7:
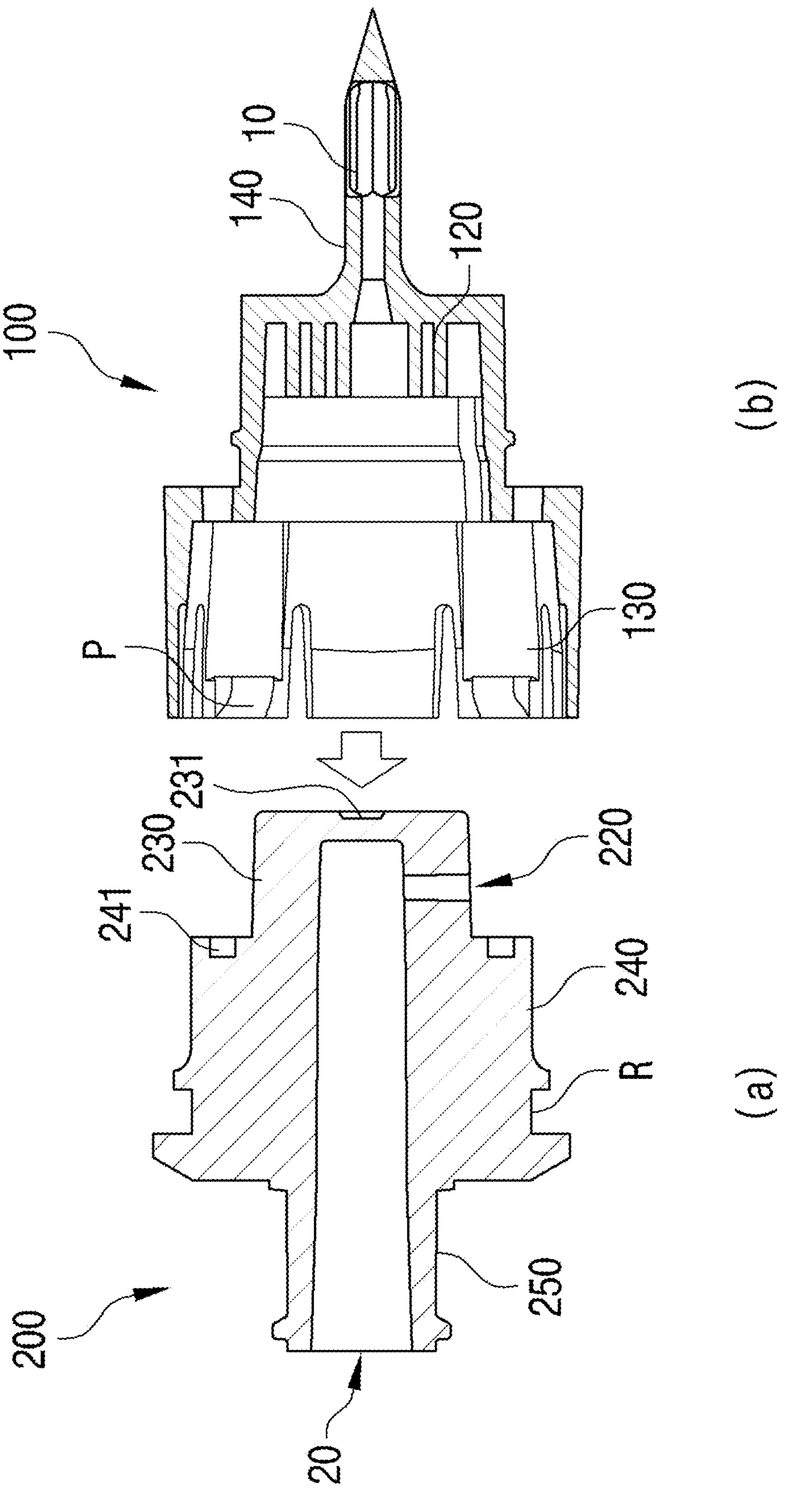
FIG. 7 is a diagram illustrating a cross section in the state that the barrel member and the plug member are separated.

A drug mixing unit according to an aspect of the present invention to solve the technical problem includes: a barrel member formed with a first channel through which a drug liquid is introduced; and a plug member provided with an insertion portion inserted into the barrel member, and formed with a second channel through which a mixed drug is extracted and a through hole connected to the second channel on a surface of the insertion portion, wherein the plug member is coupled with the barrel member to form a predetermined drug mixing space, wherein a drug is provided to form the mixed drug with being mixed with the drug liquid introduced through the first channel, and wherein a third channel is formed in an inner surface of the barrel member, through which the mixed drug moves from the drug mixing space to the through hole, wherein the barrel member is provided with a protruding type of a spike needle that forms the first channel on an outer surface thereof, wherein the spike needle is provided with at least one or more openings connected to the first channel on the outer surface thereof, and wherein the first channel is provided to have a greater radius as being close to an inner bottom surface of the barrel member, wherein the drug mixing space forms a spiral path from a predetermined position spaced apart from the first channel to the third channel, and wherein the spiral path is formed by a partition wall portion continuously provided to contact an outer bottom surface of the insertion portion of the plug member from the inner bottom surface, wherein the second channel is connected to a syringe that provides a negative pressure to introduce the drug liquid, and wherein the first channel, the second channel, and the third channel are not directly connected with each other.

Here, the plug member may include a protrusion coupling portion that forms the second channel.

Here, the third channel may be disposed with being spaced apart by a predetermined distance.

Here, the drug mixing unit may further include a protecting portion for which the barrel member provided to block the first channel from external air is inserted and supported and an under cap in which a grip portion for fixedly supporting an upper cap of a vial in which the drug liquid is stored is integrally formed.

Here, the drug mixing unit may further include an upper cap to block the second channel from external air.

Here, the drug mixing unit may further include rubber stopper in which the spike needle is inserted and supported to block the first channel from external air.

Here, the first channel may be protruded and formed with a predetermined height from the inner bottom surface of the barrier member, but formed with a height lower than the bottom surface of the insertion portion of the plug member.

Here, the drug may be a liquid phase drug, a powdered drug, or a tablet drug.

Here, the barrel member and the plug member may be fixedly supporting with each other through an uneven portion or coupled by a rotational coupling through a thread.

Here, the plug member may further include a supporting portion provided to have an outer diameter than that of the insertion portion, and further includes a silicone ring member for blocking external air when coupling with the barrel member between the insertion portion and the supporting portion of the plug member.

Here, an inner diameter of the through hole may be greater than an inner diameter of the first channel and smaller than an inner diameter of the second channel.

MODES OF THE INVENTION

The objects and effects of the present disclosure, and technical constitutions of accomplishing these will become obvious with reference to exemplary embodiments to be described below in detail along with the accompanying drawings. In describing the present disclosure, a detailed description of known function or constitutions will be omitted if it is determined that it unnecessarily makes the gist of the present disclosure unclear. In addition, terms to be described below as terms which are defined in consideration of functions in the present disclosure may vary depending on the intention of a user or an operator or usual practice.

However, the present disclosure is not limited to exemplary embodiments disclosed below but may be implemented in various forms. However, the exemplary embodiments are provided to make the present disclosure be complete and completely announce the scope of the present disclosure to those skilled in the art to which the present disclosure belongs and the present disclosure is just defined by the scope of the claims. Accordingly, the terms need to be defined based on contents throughout this specification.

Throughout the specification, when a part "includes" or "comprises" an element, unless there is a particular description contrary thereto, the part can further include other elements. Also, throughout the specification, the term "portion" or "unit" means a unit of processing at least one function or operation and may be implemented in a hardware component, a software component, or a combination of software and hardware components.

Hereinafter, a drug mixing unit for a syringe according to an embodiment of the present invention is described in detail with reference to the accompanying drawings.

FIG. 1 is a diagram illustrating a drug mixing unit 1000 according to an embodiment of the present invention, and FIG. 2 is diagram illustrating the feature that a barrel member 100 and a plug member 200 included in the drug mixing unit 1000 according to an embodiment of the present invention are separated and coupled. The barrel member 100 and the plug member 200 included in the drug mixing unit 1000 may be provided to be coupled through an uneven portion for fixedly supporting with each other or coupled through a thread for rotational coupling.

FIG. 1 shows the feature that the barrel member 100 and the plug member 200 are fixedly supporting with each other through the uneven portion.

Referring to FIG. 1, the drug mixing unit 1000 according to an embodiment of the present invention includes the barrel member 100 formed with a first channel 10 through which a drug liquid is introduced and the plug member 200 provided with an insertion portion 230 to be inserted into the barrel member 100 and formed with a second channel 20 in the insertion portion 230, through which a mixed drug is extracted, and a through hole 220 connected to the second channel 20 on an outer surface of the insertion portion 230, and the plug member 200 is coupled with the barrel member 100 to form a predetermined drug mixing space, a drug is provided to form the mixed drug with being mixed with the drug liquid introduced through the first channel 10, and a third channel 30 is formed in an inner surface of the barrel member 100, through which the mixed drug moves from the drug mixing space to the through hole 220.

The plug member 200 is provided with the insertion portion 230 to be inserted into the barrel member 100. The second channel 20 connected to the through hole 220 is formed inside of the plug member 200. Referring to FIG. 2, it is identified that the through hole 220 is formed on a side surface of the insertion portion 230.

In this case, in the case that the through hole 220 is formed to be connected to the second channel 20, the through hole 220 may be formed in the shape of being penetrated from one side of the insertion portion 230 to the point in contact with the second channel 20 or from the one side to the other side of the opposite side. However, the through hole 220 is not limited thereto, and a plurality of the through holes 220 may be formed for the case of the air-tight connection of the first channel 10, the drug mixing space, the third channel 30, and the second channel 20.

When the mixed drug moves, an inner diameter of the through hole 220 may be greater than an inner diameter of the first channel 10 and smaller than an inner diameter of the second channel 20. Through this, a suction pressure of a drug liquid such as the dilution contained in a vial and the like may be maintained, and a predetermined amount of drug liquid and/or the mixed drug may flow smoothly from the first channel to the second channel 20.

Referring to FIG. 2, in the case that the barrel member 100 and the plug member 200 are coupled, the drug mixing space is formed between a bottom surface of the insertion portion 230 and an inner surface in a barrel portion of the plug member 200.

The drug mixing space may form a spiral path from a predetermined position spaced apart from the first channel 10 to the third channel 30, and the spiral path may be formed by a partition wall portion 120 continuously provided to contact an outer bottom surface of the insertion portion 230 of the plug member 200 from an inner bottom surface 110.

FIG. 3 is a perspective diagram illustrating an inside of the barrel member 100. With reference to FIG. 3, the drug mixing space is described in more detail. Referring to FIG. 3, it is identified that the continuous partition wall portion 120 forms the spiral path adjacent to an end portion of the first channel 10 formed in the barrel member 100.

The partition wall portion 120 that forms the spiral path may be contact with the bottom surface of the insertion portion 230 of the plug member 200 and form an air-tight moving path through which the drug liquid supplied from the first channel 10 moves by the negative pressure transferred from the through hole 220. A drug to be mixed with the drug liquid inserted through the first channel 10 may be provided in advance on the spiral path. Accordingly, the spiral path may be used for the drug mixing space in which a drug liquid is mixed with a prepared drug in advance. The drug liquid may be dilution to dilute the drug, but not limited thereto, and there is no limitation for the drug liquid so long as the drug liquid functions as a solution for dissolving the drug.

Meanwhile, the drug may be a liquid phase drug, a powdered drug, or a tablet drug. For example, the drug may be freeze-dried powdered or tablet drug. The freeze-dried drug may retain solidity of a degree, not leaked through the first channel 10. Alternatively, although it is not shown, a barrier film is provided at the end portion of the first channel 10 such that a drug prepare in advance is not leaked, and the outflow of the drug may be prevented. In such a case, the barrier film may have a material dissolved by the drug but does not influence the effect of the mixture of the drug liquid and the drug.

In another example, the first channel 10 may be protruded and formed with a predetermined height from the inner bottom surface 110 of the barrier member 100 but may be formed with a height lower than the bottom surface of the insertion portion 230 of the plug member 200. That is, the end portion of the first channel 10 may be protruding at a height lower than the partition wall portion 120 and reached to the end portion of the first channel 10, and the drug is prevented from leaked through the first channel 10. Since the first channel 10 is a path through which the drug liquid prepared in a vial moved by a negative pressure, even in the case that the height protruded and formed from the inner bottom surface 110 of the barrel member 100 is formed close to the height of the partition wall portion 120, the drug liquid may move through the spiral path in which the drug is stored.

Next, the first channel 10 may be used as a path through which the drug liquid that may dissolve the drug moves. The first channel 10 may be formed inside of a spike needle 140 and provided as a passage of the drug liquid up to the inner bottom surface 110 of the barrel member 100.

Hereinafter, with reference to FIG. 4 to FIG. 6(*b*), the spike needle 140 and the first channel 10 are described in detail. In this case, the spike needle 140 may be integrally formed with the barrel member 100, but for the convenience of description, the spike needle 140 and the first channel 10 are described in a virtual separated state.

In the drug mixing unit 1000 according to an embodiment of the present disclosure, the barrel member 100 may include a protruding type of a spike needle 140 that forms the first channel 10 on an outer surface thereof, and the spike needle 140 may form at least one or more openings 40*a*, 40*b*, and 40*c* connected to the first channel 10 on the outer surface thereof.

FIG. 4 is a diagram illustrating a side surface of the protruding type spike needle 140 formed on the barrel member 100, FIG. 5 is a diagram illustrating a rear end surface and a side surface of the spike needle 140, and FIGS. 6(*a*) and 6(*b*) are diagrams exploded perspective diagram and a lateral diagram showing the spike needle 140 from a rear side.

Referring to FIG. 4 shows the feature that the openings 40*a*, 40*b*, and 40*c* are formed on the outer surface. One or more openings 40*a*, 40*b*, and 40*c* may be formed, and the drug liquid introduced through the openings 40*a*, 40*b*, and 40*c* moves to the first channel 10 and moves to the drug mixing space.

Referring to FIG. 5, a radius R1 of the first channel 10 through which the drug liquid supplied from the openings 40*a*, 40*b*, and 40*c* formed on the outer surface of the spike needle 140 is introduced is smaller than a radius R2 of the first channel 10 adjacent to the inner bottom surface 110 of the barrel member 100. This is designed, in the case that a large amount of drug liquid is introduced through the openings 40*a*, 40*b*, and 40*c*, the drug liquid is introduced while maintaining a uniform pressure, but the pressure becomes lowered before reaching the drug, and the drug liquid equally transferred to the drug prepared in the drug mixing space in advance.

Referring to FIG. 6(*a*), three openings 40*a*, 40*b*, and 40*c* are formed and provided as an insertion passage of the drug liquid, which is introduced into the narrow insertion path of the first channel 10 and move in a high pressure state, and the drug liquid is discharged to the wide discharge path to the drug prepared in advance, and accordingly, the discharge pressure may be reduced, and the drug liquid may smoothly move.

FIG. 6(*b*) shows that the openings 40*a*, 40*b*, and 40*c* is formed with a length of about ⅓ to ½ of the spike needle 140 between the end portion of the spike needle 140 and the openings 40*a*, 40*b*, and 40*c*. This is designed such that a large amount of drug liquid is transferred into the first channel 10, and the drug liquid may be transferred to the drug mixing space with stable and uniform amount. The bottom end portion (i) of the spike needle 140 and the body (ii) extended from the bottom end portion to the openings 40*a*, 40*b*, and 40*c* may be formed with a proper length depending on the capacity of a vial that stores the drug liquid. In this case, it is preferable that the bottom end portion (i) is formed to have a diameter greater than that of the body (ii) to secure the air tightness when coupled with a vial and the like.

Next, the plug member 200 of the drug mixing unit 1000 according to an embodiment of the present invention is described.

FIG. 1 shows that the through hole 220 is formed on the outer surface of the insertion portion 230 of the plug member. The through hole 220 is connected to the second channel 20 formed inside of the plug member 200 to transfer the drug mixed in the drug mixing space to the second channel 20.

As described above, the drug liquid is introduced to the first channel 10 through the openings 40*a*, 40*b*, and 40*c* and moves to the drug mixing space, and the drug mixed in the drug mixing space is transferred to the through hole 220 passing through the third channel 30 such that the mixed drug transferred from the through hole 220 is discharged through the second channel 20.

The first channel 10, the second channel 20, and the third channel 30 through which the drug liquid or the mixed drug moves may be provided not to be connected directly with each other. Hereinafter, this is described with reference to FIG. 7 and FIGS. 8(*a*) and 8(*b*).

Figure 8A:
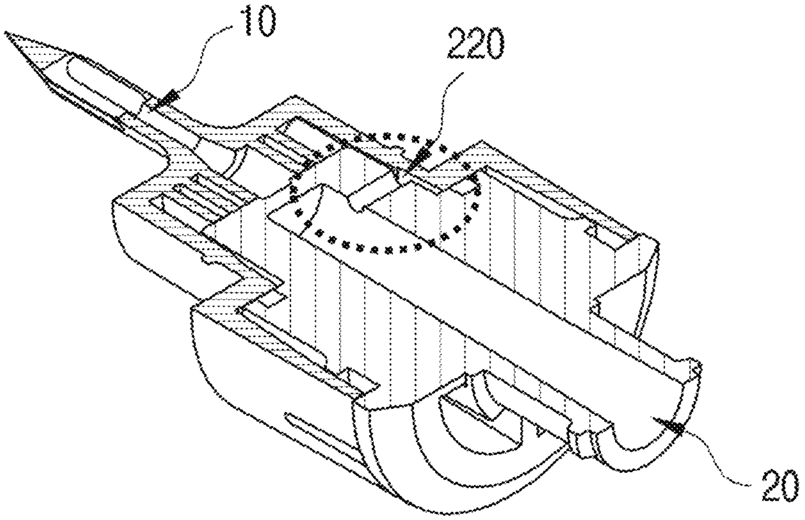
FIGS. 8(*a*) and 8(*b*) are diagrams illustrating the feature that the first channel, the second channel, and the third channel are disposed.
Figure 8B:
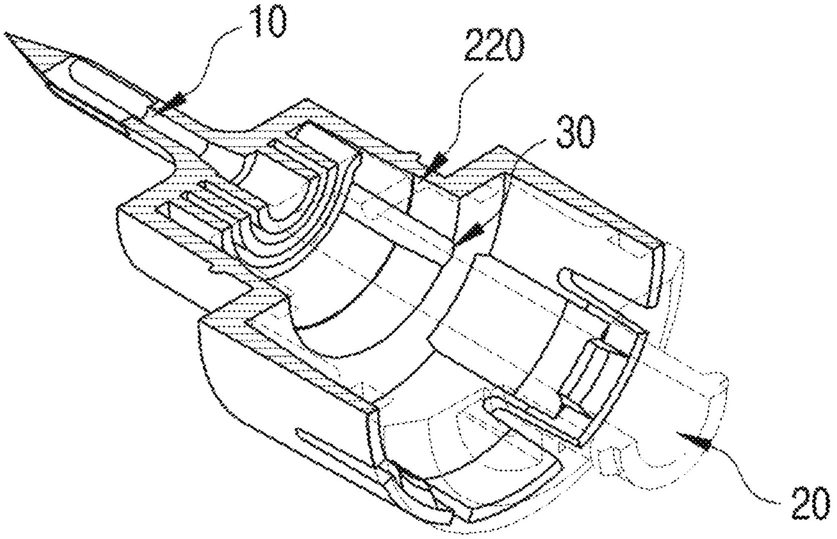

FIG. 7 is a diagram illustrating a cross section in the state that the barrel member 100 and the plug member 200 are separated, and FIGS. 8(*a*) and 8(*b*) are diagrams illustrating the feature that the first channel 10, the second channel 20, and the third channel 30 are disposed.

The illustration (a) of FIG. 7 shows the second channel 20 formed inside of the plug member 200 and the through hole 220 connected to the second channel 20. The plug member 200 may further include a supporting portion 240 provided to have an outer diameter than that of the insertion portion 230, and may further include a silicone ring member for blocking external air when coupling with the barrel member 100 between the insertion portion 230 and the supporting portion 240 of the plug member 200.

In the case that the insertion portion 230 is inserted into the barrel member 100, the supporting portion 240 and the seating portion 130 are engaged, and as described above, the insertion portion 230 and the partition wall portion 120 inside of the barrel member form the drug mixing space. In this case, a groove 231 in which the silicone member is inserted and fixed to air tight coupling with the seating portion 130 may be further provided on the lower surface of the supporting portion 240.

FIG. 8(*a*) shows that the through hole 220 is formed with being spaced apart from the inner surface of the barrel member 100. That is, in the insertion portion 230, the outer surface between the through hole 220 and the lower surface is coupled with the inner surface of the barrel member 100 in contacting manner without any gap, and the through hole 220 is provided to form a predetermined gap with the inner surface of the barrel member 100.

FIG. 2 and FIG. 8(*b*) show the third channel 30 provided such that the mixed drug moves from the drug mixing space to the through hole 220.

As shown in FIG. 8(*b*), the through hole 220 and the third channel 30 may be disposed with being spaced apart by a predetermined distance. The mixed drug moved through the third channel 30 moves to the through hole 220 after filling the predetermined gap formed between the outer surface of the upper part of the through hole 220 of the insertion portion 230 and the inner surface of the barrel member 100 entirely, rather than the feature that the through hole 220 is directly connected to the third channel 30, it is preferable to provide a sufficient time required for mixing.

Through the gap, the negative pressure provided from the syringe S, transferred to the through hole 220 by the air-tightness secured by the silicone member may be maintained. In addition, the second channel 20 may be provided to be connected to the syringe S that provides the negative pressure to introduce the drug liquid.

The drug mixing unit 1000 according to an embodiment of the present invention may be used with being coupled with the syringe S, and for this, the plug member 200 may include a protrusion coupling portion 250 that forms the second channel 20. The protrusion coupling portion 250 enables the negative pressure formed by the movement of the plunger of the syringe S coupled with the syringe S to be transferred through the second channel 20.

The drug mixing unit 1000 according to an embodiment of the present invention may further include a protecting portion 3000 for which the barrel member 100 provided to block the first channel 10 from external air is inserted and supported and an under cap in which a grip portion 2000 for fixedly supporting an upper cap of a vial in which the drug liquid is stored is integrally formed.

FIGS. 9(*a*) and 9(*b*) are diagrams illustrating the feature that the drug mixing unit 1000 is coupled with the grip portion 2000 for fixedly supporting the upper cap of the vial and the feature that a rubber stopper 4000 to which the barrel member 100 and the spike needle 140 are inserted and supported is coupled with the protecting portion 3000 to which the barrel member 100 is inserted and supported.

FIG. 9(*a*) shows the protecting portion 3000 to which the barrel member 100 is inserted and supported and the under cap in which the grip portion 2000 for fixedly supporting the upper cap of the vial in which the drug liquid is stored is integrally formed. The grip portion 2000 may grips the outer uneven portion of the vial such that the spike needle 140 is stably engaged with the vial.

FIG. 9(*b*) shows the feature that the drug mixing unit 1000 according to an embodiment of the present invention is coupled with the rubber stopper 4000 to which the spike needle 140 is inserted and supported. The spike needle 140 of the drug mixing unit 1000 may form the wide openings 40*a*, 40*b*, and 40*c* with the first channel 10, and such that the spike needle 140 is blocked from external air by using the rubber stopper 4000 to prevent the drug therein from being discharged.

FIG. 10 illustrates the feature that the drug mixing unit 1000 according to an embodiment of the present invention is coupled with the syringe S and the rubber stopper 4000 and the protecting portion 3000 are removed before being coupled with the vial. Referring to (a) of FIG. 10, the rubber stopper 4000 and the protecting portion 3000 are coupled with the syringe S, and as shown in (b) of FIG. 10, the rubber stopper 4000 and the protecting portion 3000 are removed and used before engaging the spike needle 140 to the vial.

Figure 11:
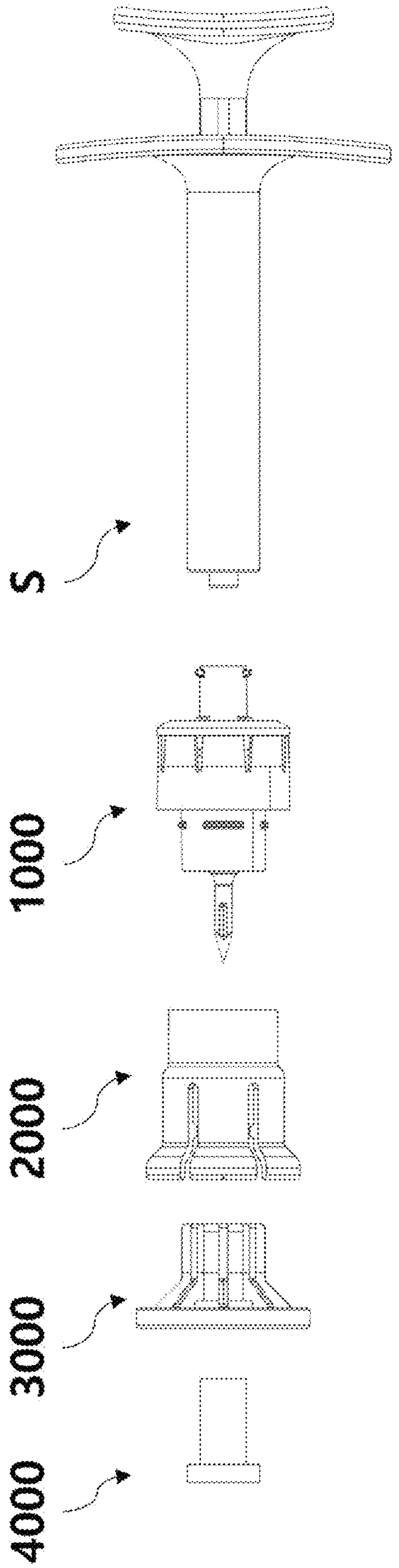
FIG. 11 is a diagram illustrating each of the drug mixing unit according to an embodiment of the present invention, the grip portion, the protecting portion, the rubber stopper, and the syringe.

FIG. 11 is a diagram illustrating each of the drug mixing unit 1000 according to an embodiment of the present invention, the grip portion 2000, the protecting portion 3000, the rubber stopper 4000, and the syringe S. As arranged in FIG. 11, the drug mixing unit 1000, the grip portion 2000, the protecting portion 3000, the rubber stopper 4000, and the syringe S, which are neighboring elements, are coupled by the tight fit, the rotational coupling through a thread, or the like.

Figure 12:
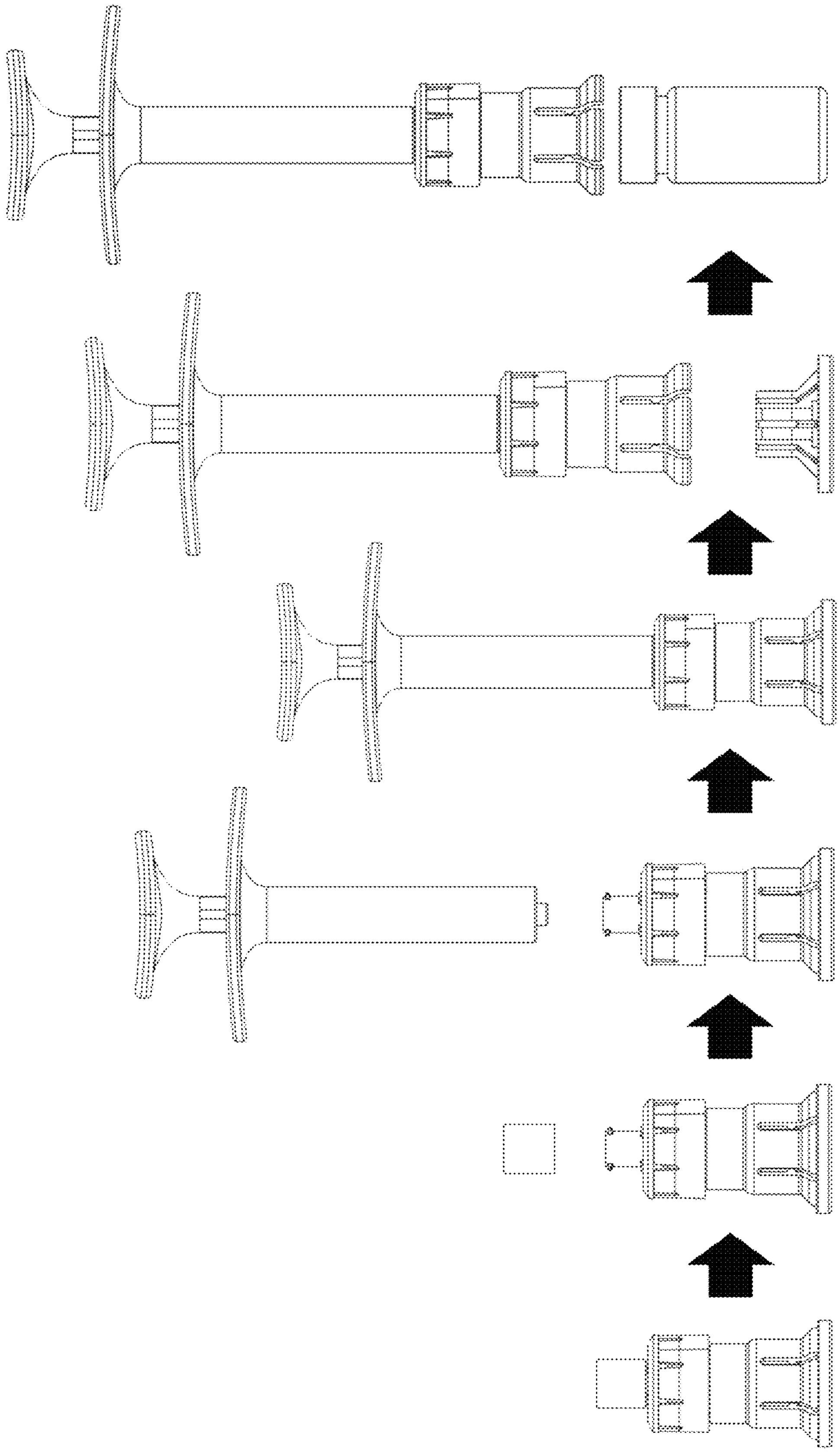
FIG. 12 is a diagram illustrating the feature that the drug mixing unit according to an embodiment of the present invention is coupled with the grip portion, the protecting portion, the rubber stopper, and the upper cap, and then, coupled with the vial sequentially.

FIG. 12 is a diagram illustrating the feature that the drug mixing unit 1000 according to an embodiment of the present invention is coupled with the grip portion 2000, the protecting portion 3000, the rubber stopper 4000, and the upper cap, and then, coupled with the vial sequentially.

Since the drug mixing unit 1000 according to an embodiment of the present invention stores the drug in advance before being coupled with the syringe S and used, it is preferable that the drug mixing unit 1000 is blocked from external air and the like. For this, the drug mixing unit 1000 according to an embodiment of the present invention may further include the upper cap to block the second channel 20 from external air. FIGS. 12(*a*) and (*b*) show the feature that the upper cap coupled with the drug mixing unit 1000 according to an embodiment of the present invention is removed immediately before a use.

FIG. 12 shows the feature the process that the drug mixing unit 1000 is coupled with the vial, and the drug mixing unit 1000 may be used in the order that the upper cap is removed from the protrusion coupling portion 250, the syringe S is coupled with the protrusion coupling portion 250, the protecting portion 3000 and the grip portion 2000 are removed, and then, the grip portion 2000 is coupled with the upper cap of the vial.

Figure 13:
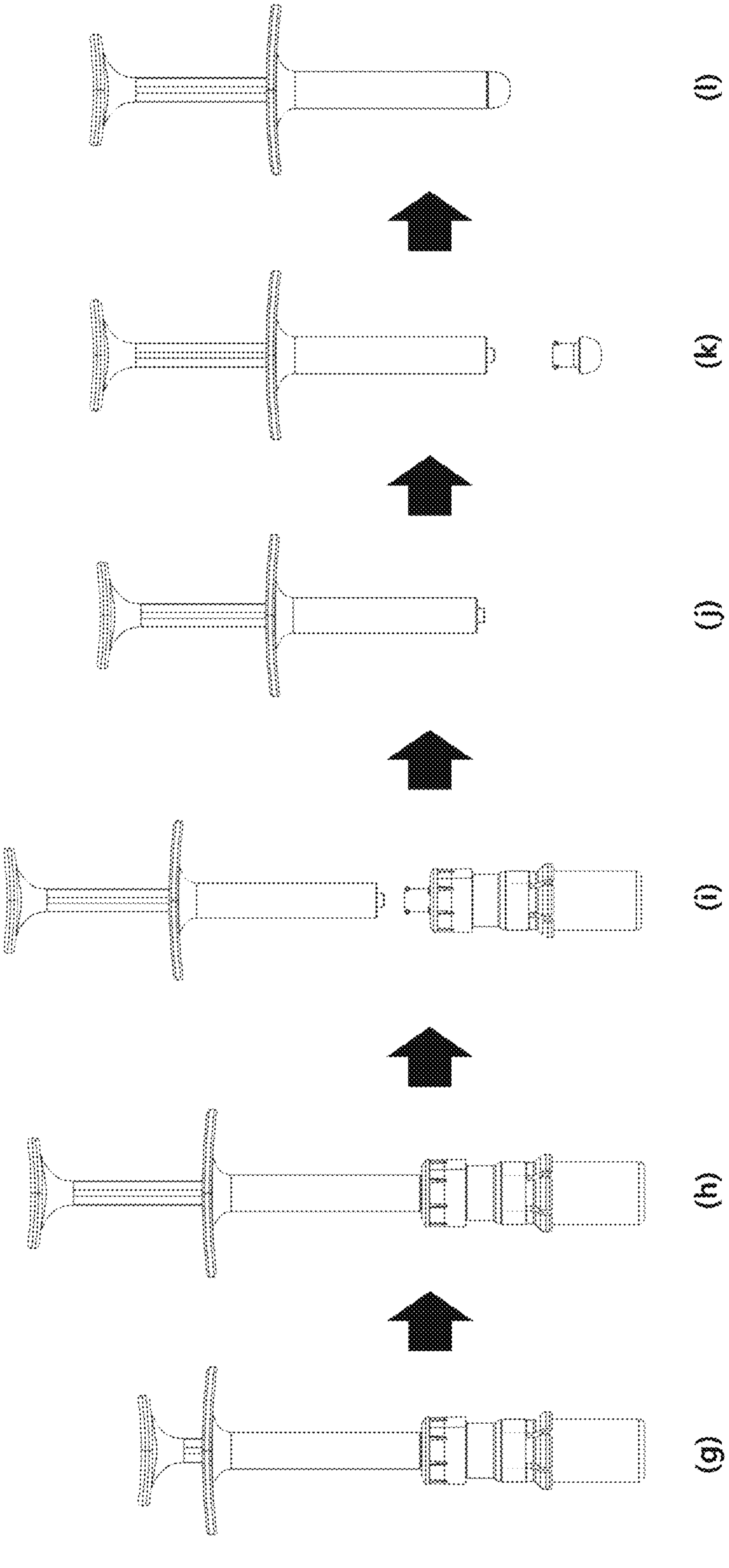
FIG. 13 is a diagram illustrating the feature that the drug mixing unit according to an embodiment of the present invention is coupled with the vial in the state of being installed with the grip portion, and the drug liquid moves to the cylinder of the syringe and the feature that a cap member for blocking the mixed drug and external air is coupled before a use finally in a sequential manner.

Next, FIG. 13 is a diagram illustrating the feature that the drug mixing unit 1000 according to an embodiment of the present invention is coupled with the vial in the state of being installed with the grip portion 2000, and the drug liquid moves to the cylinder of the syringe S and the feature that a cap member for blocking the mixed drug and external air is coupled before a use finally in a sequential manner.

To prevent leakage of the drug, until the drug mixing unit 1000 is engaged with the vial, it is preferable that the drug mixing unit 1000 in the state of being located on an upper position than the vial from the ground moves in a lower direction, and coupled with the vial.

Meanwhile, FIG. 13(*h*) shows the feature that the plunger of the syringe S moves from the ground in the upper direction, and the drug liquid of the vial moves. However, the present invention is not limited thereto, and considering a size of the vial, an amount of drug liquid included in the vial, the spatial position after the openings 40*a*, 40*b*, and 40*c* is inserted into the vial, and the like, by leaning or locating the vial to be positioned upper than the syringe S, and the drug liquid moves to the cylinder of the syringe S.

FIGS. 13(*h*) to (*l*) show that a sealing cap is put until the mixed drug in the syringe S is used after the mixed drug is filled in the cylinder of the syringe S, and the mixed drug may be stored in the state of blocking external air.

In the disclosure and the drawings, the preferred embodiment of the present invention is disclosed. Although specific terms are used herein, the terms are just used in the general meanings to easily describe the description of the invention and help understanding of the invention, but not intended to limit the scope of the present invention. It is understood that the other modified examples based on the inventive concept of the present invention is also able to be embodied as well as the embodiment disclosed herein to those of ordinary skilled in the art to which the present invention pertains.

The invention claimed is:

1. A drug mixing unit comprising:

a barrel member formed with a first channel through which a drug liquid is introduced; and a plug member provided with an insertion portion inserted into the barrel member, and formed with a second channel through which a mixed drug is extracted and a through hole connected to the second channel on a surface of the insertion portion, wherein the plug member is coupled with the barrel member to form a predetermined drug mixing space, wherein a drug is provided to form the mixed drug with being mixed with the drug liquid introduced through the first channel, and wherein a third channel is formed in an inner surface of the barrel member, through which the mixed drug moves from the drug mixing space to the through hole, wherein the barrel member is provided with a protruding type of a spike needle that forms the first channel on an outer surface thereof, wherein the spike needle is provided with a plurality of openings connected to the first channel on the outer surface thereof, and wherein the first channel is provided to have a greater radius as being close to an inner bottom surface of the barrel member, wherein the drug mixing space forms a spiral path from a predetermined position spaced apart from the first channel to the third channel, and wherein the spiral path is formed by a partition wall portion continuously provided to contact an outer bottom surface of the insertion portion of the plug member from the inner bottom surface, wherein the second channel is connected to a syringe that provides a negative pressure to introduce the drug liquid, and wherein the first channel, the second channel, and the third channel are not directly connected with each other.

2. The drug mixing unit of claim 1, wherein the plug member includes a protrusion coupling portion that forms the second channel.

3. The drug mixing unit of claim 1, wherein the third channel is disposed with being spaced apart by a predetermined distance.

4. The drug mixing unit of claim 1, wherein the drug mixing unit further includes a protecting portion for which the barrel member provided to block the first channel from external air is inserted and supported and an under cap in which a grip portion for fixedly supporting an upper cap of a vial in which the drug liquid is stored is integrally formed.

5. The drug mixing unit of claim 1, wherein the drug mixing unit further includes an upper cap to block the second channel from external air.

6. The drug mixing unit of claim 1, wherein the drug mixing unit further includes rubber stopper in which the spike needle is inserted and supported to block the first channel from external air.

7. The drug mixing unit of claim 1, wherein the first channel is protruded and formed with a predetermined height from the inner bottom surface of the barrier member, but formed with a height lower than the bottom surface of the insertion portion of the plug member.

8. The drug mixing unit of claim 1, wherein the drug is a liquid phase drug, a powdered drug, or a tablet drug.

9. The drug mixing unit of claim 1, wherein the barrel member and the plug member are fixedly supporting with each other through an uneven portion or coupled by a rotational coupling through a thread.

10. The drug mixing unit of claim 1, wherein the plug member further includes a supporting portion provided to have an outer diameter than that of the insertion portion, and further includes a silicone ring member for blocking external air when coupling with the barrel member between the insertion portion and the supporting portion of the plug member.

11. The drug mixing unit of claim 1, wherein an inner diameter of the through hole is greater than an inner diameter of the first channel and smaller than an inner diameter of the second channel.

* * * * *